(12) United States Patent
Wallace

(10) Patent No.: US 6,576,130 B2
(45) Date of Patent: Jun. 10, 2003

(54) ABSORPTION FIELD RECLAMATION AND MAINTENANCE SYSTEM

(75) Inventor: Scott D. Wallace, Marine on St. Croix, MN (US)

(73) Assignee: North American Wetland Engineering, Inc., Forest Lake, MN (US)

( * ) Notice: Subject to any disclaimer, the term of this patent is extended or adjusted under 35 U.S.C. 154(b) by 48 days.

(21) Appl. No.: 09/907,519

(22) Filed: Jul. 17, 2001

(65) Prior Publication Data

US 2002/0043497 A1 Apr. 18, 2002

Related U.S. Application Data

(60) Provisional application No. 60/218,615, filed on Jul. 17, 2000.

(51) Int. Cl.$^7$ ............................................. C02F 3/30
(52) U.S. Cl. ............... 210/605; 210/614; 210/747; 210/139; 210/170; 210/221.2; 210/260; 210/532.1; 405/43; 405/51
(58) Field of Search ................................. 210/605, 614, 210/630, 747, 139, 170, 220, 221.2, 259, 260, 418, 532.1, 532.2; 405/43, 50, 51

(56) References Cited

U.S. PATENT DOCUMENTS

| | | | | |
|---|---|---|---|---|
| 3,662,890 A | | 5/1972 | Grimshaw | |
| 3,680,704 A | | 8/1972 | Schaefer | |
| 3,914,164 A | * | 10/1975 | Clark | .................. 205/756 |
| 3,923,656 A | | 12/1975 | Krebs et al. | |
| 4,002,561 A | | 1/1977 | Traverse | |
| 4,021,338 A | | 5/1977 | Harkin | |
| 4,123,800 A | | 10/1978 | Mazzei | |
| 4,439,323 A | | 3/1984 | Ball | |
| 4,474,477 A | | 10/1984 | Smith et al. | |
| 4,650,585 A | * | 3/1987 | Hong et al. | .................. 210/605 |
| 4,895,645 A | * | 1/1990 | Zorich, Jr. | .................. 210/98 |
| 5,352,357 A | | 10/1994 | Perry | |
| 5,382,357 A | | 1/1995 | Nurse | |
| 5,382,363 A | | 1/1995 | Boylen | |
| 5,454,949 A | | 10/1995 | Davis et al. | |
| 5,482,621 A | | 1/1996 | Nurse | |
| 5,492,635 A | | 2/1996 | Ball | |
| 5,534,147 A | | 7/1996 | Kallenbach et al. | |
| 5,582,716 A | | 12/1996 | Nurse, Jr. | |
| 5,591,331 A | | 1/1997 | Nurse, Jr. | |
| 5,613,773 A | | 3/1997 | Scott et al. | |
| 5,647,986 A | | 7/1997 | Nawathe et al. | |
| 5,674,312 A | | 10/1997 | Mazzei | |
| 5,840,196 A | | 11/1998 | Laurent | |
| 5,951,922 A | | 9/1999 | Mazzei | |
| 6,004,463 A | | 12/1999 | Swett | |
| 6,068,773 A | | 5/2000 | Sheaffer | |
| 6,068,778 A | | 5/2000 | Steiner et al. | |
| 6,270,661 B1 | * | 8/2001 | Jowett | .................. 210/151 |

OTHER PUBLICATIONS

Mickelson et al., "Hydrogen Peroxide Renovation of Clogged Wastewater Soil Absorption Systems in Sands," *Transactions of the ASAE*, 32(5):1662–1668, Sep.–Oct. 1989.

Converse et al., "Renovating Failing Septic Tank–soil Absorption Systems Using Aerated Pretreated Effluent," 416–423, Dec. 1994.

(List continued on next page.)

*Primary Examiner*—Fred Prince
(74) *Attorney, Agent, or Firm*—Patterson, Thuente, Skaar & Christensen, P.A.

(57) ABSTRACT

A wastewater absorption field reclamation and maintenance system, wherein effluent (wastewater) is oxygenated such that BOD is not reduced in the effluent, the oxygenated effluent being delivered to the absorption field. As the oxygenated effluent flows to the absorption field, the enhanced oxygen enables aerobic decomposition of organic matter which has reduced the infiltrative capacity of the absorption field.

67 Claims, 3 Drawing Sheets

OTHER PUBLICATIONS

"National Onsite Wastewater Recycling Association/ NOWRA 2000 Conference Proceedings," pp. 91–96, Year 2000.

Design Manual Number 35, "Onsite Wastewater Treatment and Disposal Systems/WWBKDM35," USEPA Office of Water Program Operations, EPA 625/1–80/012, Jan. 1980.

* cited by examiner

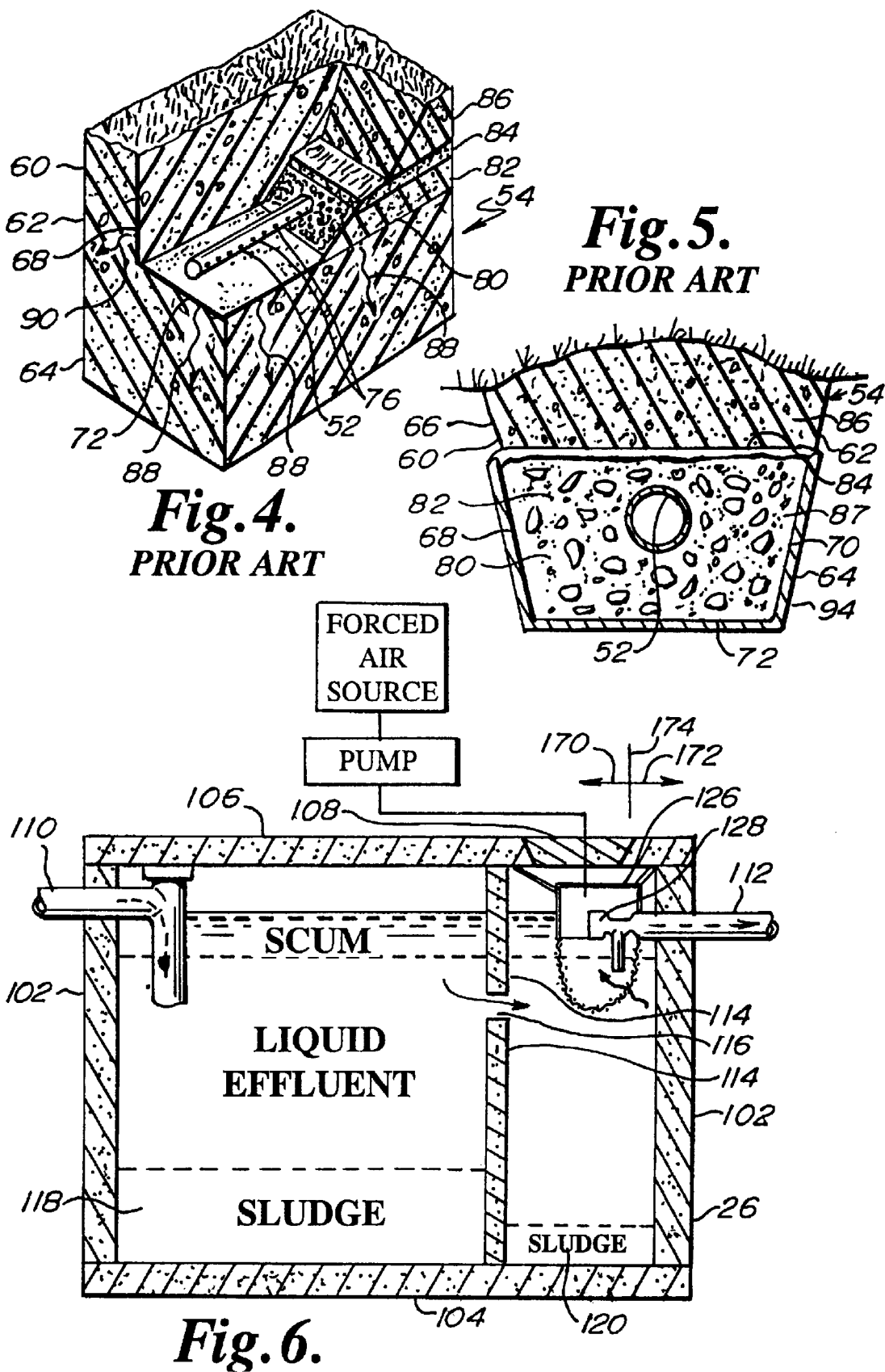

ABSORPTION FIELD RECLAMATION AND MAINTENANCE SYSTEM

CROSS-REFERENCES TO RELATED APPLICATIONS

This application claims priority under 35 U.S.C. §119(e) to, and hereby incorporates by reference, U.S. Provisional Application No. 60/218,615, filed Jul. 17, 2000.

BACKGROUND OF THE INVENTION

1. Field of the Invention

This invention relates to drainfields and, in particular, this invention relates to a process for renovating failed septic tank soil absorption systems or maintaining functioning septic tank soil absorption systems.

2. Background

A typical on-site septic system is disclosed in FIGS. 1–3 generally at 20 and includes a hydraulic system 21 and an absorption field 22. Sewage is generated from a facility, such as a house 23, and flows through a sewer line 24 into a settling tank, such as a septic tank 26. Upon being conveyed to the septic tank 26, solid materials are allowed to settle out of the sewage and the separated liquid effluent (wastewater) then flows through line 28 to the absorption field 22 via a system designated generally at 30.

The system 30 depicted in FIG. 1 is a trench system and will be more particularly described hereinbelow. However, the present method is contemplated to be applicable to bed systems, seepage pits, mound systems, or any other system using an underlying soil profile to absorb and detoxify wastewater. These and other disposal systems are disclosed in *Onsite Wastewater Treatment and Disposal Systems*, Design Manual No. 35, U.S.E.P.A. (January 1980), hereby incorporated by reference Each of these disposal systems uses an absorption field defined in a soil profile to dispose and purify wastewater. While the following discussion addresses primarily a trench system, the problem of maintaining and reclaiming soil absorption systems is common to each method of wastewater disposal and the present The trench system depicted in FIGS. 1–3 includes distribution boxes 32, 34, and 36, lines 38 and 40, and laterals 42, 44, 46, 48, 50, and 52. Wastewater is conveyed from the septic tank 26 through the line 28 to the distribution box 32. The distribution box 32 usually divides wastewater flowing therein between the laterals 42 and 48 and the line 38. The line 38 conveys wastewater to the distribution box 34. The distribution box 34 divides the wastewater flowing therein between the laterals 44 and 50 and the line 40. The wastewater flowing through the line 40 flows into the distribution box 36, where the waste water is divided between laterals 46 and 52. Each of the distribution boxes 32, 34, and 36 may include valves or the like to further control the flow and distribution of wastewater. For instance, the distribution box 34 could contain a valve controlling the flow or the amount of flow, to the laterals 44 and 50, as well as the line 40.

The entire disposal system 20 is usually buried. However, for the sake of clarity, the absorption system 30 is shown as being buried within a trench system 54. With the exception of the permeable laterals 42, 44, 46, 48, 50, and 52, the entire disposal system is usually impermeable to fluid egress. The laterals usually contain perforations or other openings to allow egress of wastewater into the soil profile.

Referring to FIGS. 4 and 5, the exemplary trench system 54 is present within a soil profile 60. The soil profile 60 may arbitrarily be considered to include an upper portion 62 and a lower portion 64. A trench 66 is excavated in the soil profile 60 and is defined by sidewalls 68 and 70 and a bottom 72. The sidewalls 68 and 70 are defined by the upper soil profile portion 62 and the bottom is defined by the lower soil portion 64. As can be seen, one of the laterals 52 has been installed within the trench 66. A multiplicity of perforations 76 for wastewater egress can be seen in the lateral 52. A layer 80 of aggregate, such as gravel, is laid in the trench 66 so as to more or less evenly cover the bottom 72 to a desired height (e.g., four inches). The lateral 52 is then laid atop the gravel layer 80 and another gravel layer 82 is poured in to cover the lateral 52 to a desired height (e.g., six inches). A usually semi-permeable barrier 84 covers the gravel layer 82 and backfill 86 is used to fill the remainder of the trench 66. The barrier 84 prevents the backfill from penetrating, and plugging, the gravel layers 80 and 82 and may also shed moisture percolating down from the surface of the soil profile 60. Shedding moisture thusly may be desirable to prevent the gravel layers 80 and 82 from being filled by water percolating from the surface. Wastewater egresses the lateral 52 via the perforations 76 and enters the interstitial spaces between the gravel particulates in layers 80 and 82. From the layers 80 and 82, the wastewater enters the soil profile 60 by being absorbed through an infiltrative surface 87 formed by the sidewalls 68 and 70 and bottom 72. The direction of the wastewater flow through the soil profile 60 is generally down as indicated by arrows 88, but may be somewhat lateral as depicted by arrow 90. The texture and water content are two major factors determining the extent and direction of the travel of the wastewater entering the soil profile 60. Upon entering the soil profile 60, the wastewater is exposed primarily to bacteria disposed on the surface of the soil particulates. These bacteria detoxify the wastewater by decomposing undesirable compounds dissolved or suspended therein. When the portion of the soil profile 60 surrounding the trench 66 becomes saturated with wastewater, wastewater pools within the gravel layers 80 and 82 until soil conditions allow for wastewater entry and percolation.

Initially, wastewater flows relatively freely into the soil profile 60. However over time, the soil profile 60 loses the ability to absorb the wastewater. When the hydraulic loading rate of the system exceeds the wastewater infiltration of the soil profile, the wastewater begins to pond, or accumulate, in the system. If this situation continues, the net result is wastewater backing up into the home or appearing the above the ground surface above the absorption field 30. In either event, the septic system is considered to have failed. Remedies for restoring absorption fields which will no longer absorb sufficient amounts of wastewater include discontinuing use of the system, use of hydrogen peroxide or other oxidizing agents such as ozone in the disposal field, reduction of the BOD of effluent leaving the settling tank, or installing a new absorption field. Moreover, maintaining the equipment necessary to produce hydrogen peroxide or ozone can be time consuming and costly as well. Discontinuing use of septic systems is usually not feasible. Moreover, applying hydrogen peroxide or other oxidizing agents to the soil profile has often not renovated the system and has been observed to be deleterious to the soil structure. Reducing BOD and suspended solids in wastewater being conveyed to an absorption field is frequently expensive and requires continual monitoring and maintenance.

While not desiring to be limited to any particular theory, a layer called a biological mat or biomat 94 (FIG. 5) forms proximate the soil infiltrative surface (i.e., proximate sidewalls 68 and 70 and bottom 72). The biomat may be anaerobic residues as well as undecomposed solids from wastewater, bacteria, and bacterial extracelluar polymers which clog the soil pores within the biomat layer 94. Due to the lack of available oxygen, an almost exclusively anaerobic environment is created within the portion of the soil profile 60 being infiltrated by wastewater, especially so proximate where the biomat layer 94 forms. A nonlimiting listing of anaerobic microbes often present in soil include bacterial genera Sphaerotilus, Pseudomonas, Escherichia, Salmonella, Shigella, Klebsiella, Enterobacter, Aeromonas, Desulfovibrio, Clostridium, Streptococcus, and Methanobacterium, and other microbial genera Nocardia and Streptomyces. A nonlimiting listing of aerobic bacterial genera often present in soil includes Rhodospirillum, Chlorobium, Beggiatoa, Flexibacter, Thiothrix, Nitrosomonas, Nitrobacter, Thiobacillus, and Bacillus. In contrast to anaerobic bacteria, aerobic bacteria are much more efficient in decomposing organic matter within the effluent, whether the organic matter is dissolved in the water or present as suspended solids. Therefore, delivery of dissolved oxygen via wastewater, may be useful in promoting aerobic activity and restoring the hydraulic conductivity within failed or failing absorption field systems.

There is then a need for a system to both maintain and rehabilitate an absorption field. There is a particular need for a system to maintain and restore an absorption field without reducing the BOD of effluent being conveyed to the absorption field.

SUMMARY OF THE INVENTION

The present invention substantially meets the aforementioned needs of the art by providing an absorption field reclamation and maintenance system. The absorption field reclamation and maintenance system of this invention restores and/or maintains absorption fields without reducing the BOD of effluent (wastewater) being conveyed to the absorption field.

It is therefore an object of this invention, to provide a wastewater disposal system, the wastewater disposal system including a hydraulic system and an absorption field. The hydraulic system conveying wastewater effluent from a facility (e.g., a residence) to an absorption field. The hydraulic system may include an anaerobic portion and aerobic portion, the anaerobic portion with an anaerobic BOD, the aerobic portion with an anaerobic BOD, the anaerobic BOD substantially equal to the aerobic BOD. In some embodiments, the aerobic BOD may be at least 90 percent, 95 percent, or 99 percent of the anaerobic BOD. The hydraulic system may include a settling tank, an impermeable fluid conducting member, and a permeable fluid conducting member. The settling tank receives wastewater from the facility. Solids settle from the wastewater and insoluble materials separate from the wastewater in the settling tank. Effluent, separated from the settled solids and insoluble materials, flows from the settling tank to the impermeable fluid conducting member. The permeable fluid conducting member receives effluent from the impermeable fluid conducting member and provides openings for egressing effluent into the absorption field.

The anaerobic portion of the hydraulic system may be disposed in a portion of the settling tank, in the settling tank and a portion of the impermeable fluid conducting member, or in the settling tank and an adjoining portion of the impermeable fluid conducting member. The aerobic portion may be intermittent via a mechanism, such as a timer-actuated aerator, configured and disposed to oxygenate effluent flowing through one of the settling tank and the impermeable member. The oxygenating mechanism may substantially separate the aerobic from the anaerobic portions. The oxygenating system may include an air pump, the air pump may be in fluid communication with the settling tank and/or the impermeable conducting member. The oxygenating mechanism may further include an oxygen sensor to sense a dissolved oxygen concentration in the effluent and to activate an air pump or aerator, when the effluent dissolved oxygen concentration reaches a predetermined minimum effluent dissolved oxygen concentration. When the oxygenating mechanism includes a timer in electric communication with the air pump or aerator, the timer may actuate the air pump to periodically oxygenate effluent. The oxygenating mechanism may oxygenate the effluent to achieve an effluent oxygen concentration sufficient to support aerobic soil organisms in the absorption field. The absorption field may define one infiltration surface or a plurality of infiltration surfaces proximate the permeable fluid conducting member. The infiltration surfaces, in turn, may define a cavity, such as a trench, accommodating the permeable fluid conducting member. Aggregate may be disposed in the trench and substantially surround the permeable fluid conducting member. A lift station in fluid communication with the impermeable member may be present, e.g., when the absorption field elevation is higher than elevations of upstream portions of the hydraulic system (settling tank).

There is also provided a process for enhancing effluent infiltration capacity of an absorption field. The absorption field may define an infiltrative surface and may receive effluent from a hydraulic system at the infiltrative surface. The hydraulic system may functionally include an anaerobic portion and an anaerobic portion separated at an interface. The anaerobic portion may be characterized by an anaerobic BOD. The aerobic portion may be characterized by an aerobic BOD and may be disposed downstream from the anaerobic portion. The anaerobic BOD may be substantially equal to the aerobic BOD. The process may include 1) dissolving oxygen in the effluent proximate the interface, thereby generating oxygenated effluent; and 2) flowing the oxygenated effluent from the interface to the absorption field infiltrative surface. If a biomat is proximate the infiltrative surface, the process may include aerobically decomposing the biomat. Oxygen may be dissolved in the effluent when the effluent is flowing through the impermeable member, through the permeable member, or proximate a lift station at a location proximate the interface. The amount of oxygen dissolved in the effluent over periods of twelve hours, 24 hours, seven days, fourteen days, 30 days, 60 days, 90 days, or six months may be at least equal to the biomat BOD. The amount of oxygen dissolved in the effluent over the preceding periods may also be at least equal to a BOD mass load exerted by the biomat, the mass load being equal to the BOD concentration entering the infiltrative surface multiplied by the wastewater flow entering the infiltrative surface. In another sense, the oxygen dissolved in the effluent may be sufficient to create an oxygen concentration in the effluent such that an oxidation/reduction potential of at least −250 mV, −75 mV, +120 mV, +220 mV, or +400 mV is generated proximate the infiltrative surface. The oxygen dissolved in the effluent may be sufficient to create a measurable oxygen concentration (greater than zero ppm) at the infiltrative surface. The oxygen dissolved in the effluent over one of the preceding periods may be sufficient to increase the hydraulic conductivity of the soil proximate the interface by at least 0.1 inch per hour. In another aspect a sufficient amount of oxygen may be dissolved to eliminate pondering at the interface over one of the preceding time periods.

One feature of the present system and method is that absorption fields are reclaimed or maintained without reducing the BOD of the effluent being disposed of therein.

Another feature of the present system and method is that absorption fields are reclaimed or maintained without using expensive and maintenance-intensive oxidizers such as hydrogen peroxide or ozone.

Still another feature of the present system and method is that absorption fields are reclaimed or maintained, rather than being replaced.

Yet another feature of the present system and method is that absorption fields are reclaimed or maintained without being idled for an extended period of time.

These and other objects, features, and advantages of this invention will become apparent from the description which follows, when considered in view of the accompanying drawings.

BRIEF DESCRIPTION OF THE DRAWINGS

FIG. 4 is a sectional view of a lateral of FIGS. 1–3 disposed in an absorption field trench;

FIG. 5 is a sectional view of the lateral and absorption field trench of FIG. 5;

FIG. 6 is a vertical section of a settling tank and outlet with an aerator of the present invention operably disposed between the settling tank and outlet;

Figure 1:
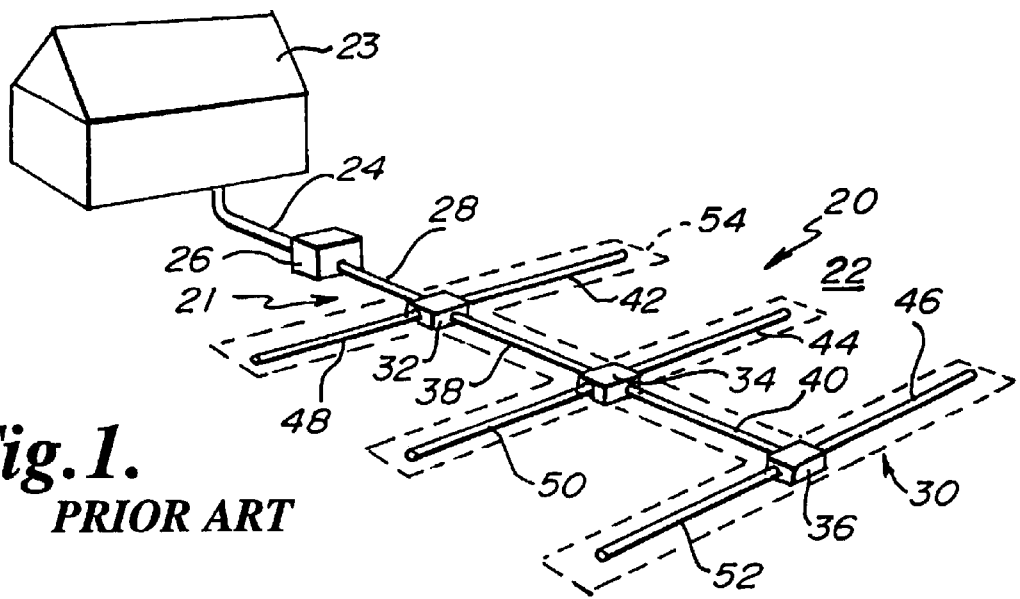
FIG. 1 is a perspective view of one embodiment of a wastewater disposal system.
Figure 2:
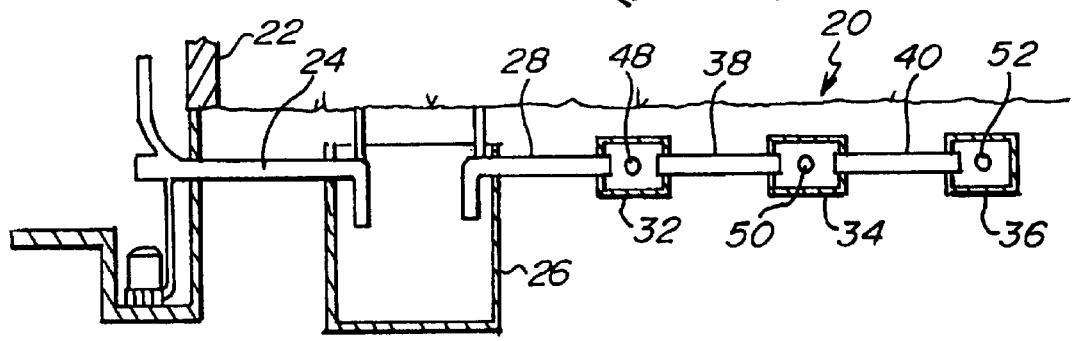
FIG. 2 is a vertical section of the wastewater disposal system of FIG. 1.
Figure 3:
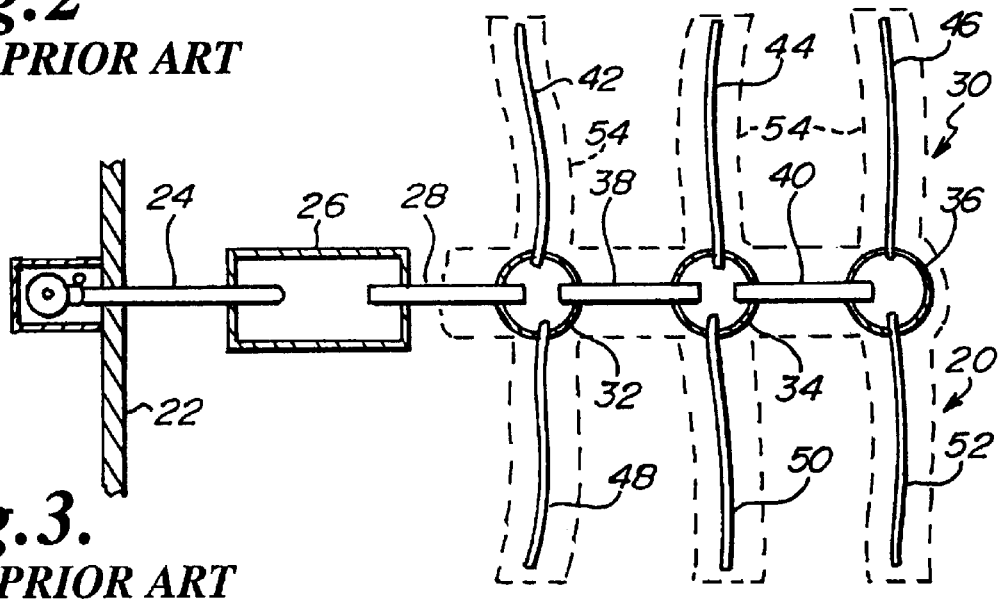
FIG. 3 is a plan view of the wastewater disposal system of FIG. 1.

It is understood that the above-described figures are only illustrative of the present invention and are not contemplated to limit the scope thereof.

DETAILED DESCRIPTION OF THE INVENTION

Comprehension of this invention can be gained through reference to the drawings in conjunction with a thorough review of the following explanation. In order to facilitate a full appreciation of the invention, an overview of an exemplary embodiment is initially provided. The overview is followed by more detailed explanation.

Any references to such relative terms as front and back, right and left, top and bottom, upper and lower, horizontal and vertical, or the like, are intended for convenience of description and are not intended to limit the present invention or its components to any one positional or spatial orientation. All dimensions of the components in the attached figures may vary with a potential design and the intended use of an embodiment of the invention without departing from the scope of the invention.

Unless otherwise specified, biological or biochemical oxygen demand (BOD) is considered to be a measure of the concentration of organic impurities in a liquid such as wastewater or effluent and is measured as the amount of oxygen required by bacteria while essentially totally decomposing the organic impurities over a five day period. BOD may be expressed in mg/l and may be determined entirely by the availability of organic impurities in the wastewater or effluent to be used as biological food, and by the amount of oxygen aerobically utilized during oxidation of the organic impurities.

Unless otherwise specified, aerobic shall be considered as describing the state of having molecular oxygen ($O_2$) as a part of the environment or as describing organisms which grow and develop only in the presence of molecular oxygen and/or which decompose organic matter only in the presence of molecular oxygen.

Unless otherwise specified, anaerobic is considered to describe the absence of molecular oxygen ($O_2$) or to describe organisms which grow and develop in the absence of molecular oxygen, and/or which decompose organic matter in the absence of molecular oxygen.

Unless otherwise defined, biomat shall be considered to be a layer of a soil absorption field receiving wastewater effluent from a wastewater disposal system and having a decreased hydraulic conductivity or ability to take up wastewater effluent (e.g., via reduced pore size). Under most circumstances a biomat BOD is at least equal to the BOD of wastewater being absorbed by the absorption field in which the biomat is located and may be considered to be a measure of mass or the product of flow rate of the wastewater effluent and the concentration of organic waste in the effluent.

Referring to FIG. 6, a cross-section of a modified typical settling tank, such as septic tank 26, is depicted. The septic tank 26 includes sidewalls 102, a bottom 104, and a top 106. The top 106 includes an access cover 108. An inlet 110 conveys sewage into the septic tank 26 and an outlet 112 conveys separated wastewater (or liquid effluent) therefrom. A baffle 114 extends across the cavity within the septic tank 26 and defines an opening 116. The opening 116 communicates between the reservoirs 118 and 120. Wastewater entering the septic tank 26 enters through the inlet 110 in to the reservoir 118. While in the reservoir 118, solids are allowed to settle from the sewage and the insoluble materials form an upper layer. The settled solids are generally termed sludge and the insoluble materials usually coalesce to form an upper scum layer. Between the sludge and the scum layers is a liquid effluent layer. The liquid effluent from this layer flows into the reservoir 120 via the opening 116. From the reservoir 120, the effluent normally exits the septic tank 26 via the outlet 112 as wastewater and is conveyed to an absorption field as described above. The wastewater contains dissolved and suspended compounds, whose concentrations or titers must be reduced or eliminated to acceptable levels before the wastewater is considered to be detoxified.

Figure 8:
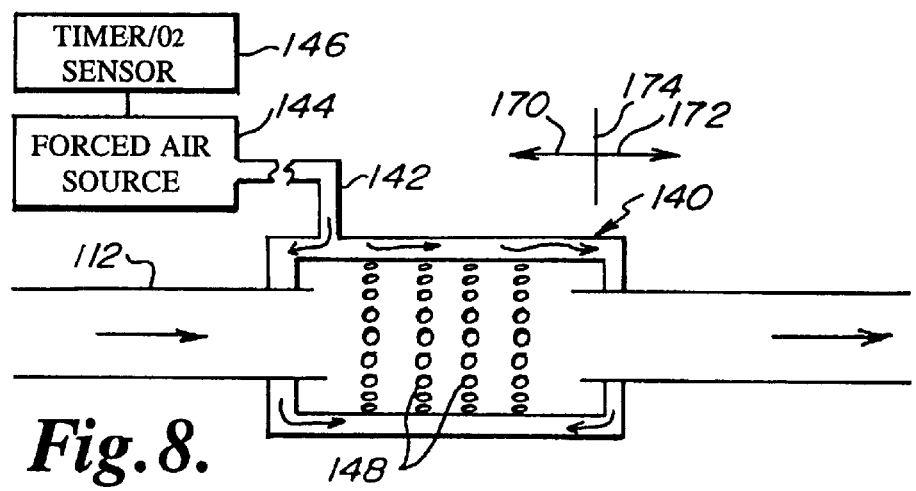
FIG. 8 is a partial vertical section of a second embodiment of an aerator of the present invention operably disposed in an outlet.

The present invention advantageously employs an aerating mechanism 126 suspended in the septic tank 26 to significantly increase the concentration of dissolved oxygen in the wastewater being conveyed to a failed or failing absorption field without removing suspended solids or BOD. In one embodiment, a mixer-injector 128 is used to aspirate air into the wastewater to significantly increase the wastewater dissolved oxygen concentration. One suitable mixer-injector is disclosed in U.S. Pat. No. 4,123,800 issued to Mazzei and is hereby incorporated by reference. However, other mechanisms may be suitable with modifications readily apparent to a person of ordinary sill in the art as well. Alternatively, a mechanism for delivering air into a line conveying wastewater to a drainfield, such as air hose 130 may be utilized. Alternatively, the air hose 130 may be used to convey air from a forced air source 132 (e.g., compressor or air tank) into the mixer or aspirator downstream of the settling tank to reduce the energy and capacity required to force air into the wastewater. Another embodiment utilizing the present method is depicted in FIG. 8, wherein a collar 140 receives forced air through an air line 142, the air being pressurized, e.g., at a forced air source such as a compressor 144. Controls such as a timer and/or oxygen sensor 146 may activate and deactivate the forced air source. The forced air would be bubbled through wastewater being conveyed through the collar 140 via apertures 148. The timer 146 would activate the aerator or forced air source for designated time intervals predesignated times. The oxygen sensor would have sensor (not shown) to determine the $O_2$ concentration of the effluent (e.g., downstream from the location of the air hose 130) and actuate the aerator when the $O_2$ concentration was less than a designated level.

Figure 9:
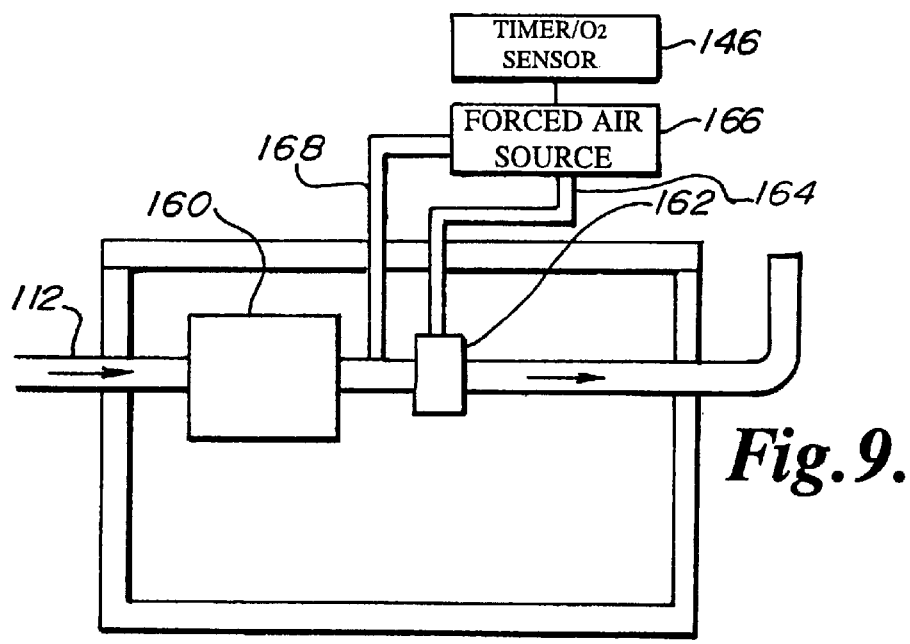
FIG. 9 is a partial vertical section of a third embodiment of an aerator of the present invention operably disposed in an outlet and proximate a lift station.

The present method may also be used in conjunction with a lift pump 160 (FIG. 9). Downstream from the lift pump 160 is a mixer-aspirator 162 or the like for injecting air into wastewater being pumped to a higher elevation. An air line 164 alternatively conveys pressurized air from a forced-air source 166 if a hybrid venturi-pressurized system is employed. An air line 168 may be present in lieu of, or in addition to, the mixer-aspirator 162 to inject air downstream from the pump 160. The present method is contemplated to include continuous or periodic oxygenation of wastewater being conveyed to a soil absorption field. Discontinuous or periodic oxygenation of wastewater could occur during specified periods of time, e.g., when wastewater was present in the lines, or when oxygen concentrations were below a specified level. Moreover, in a maintenance system, the present system would be configured to oxygenate wastewater for a required period of time at, e.g., weekly or monthly intervals to maintain the hydraulic capacity of a given absorption field.

Figure 7:
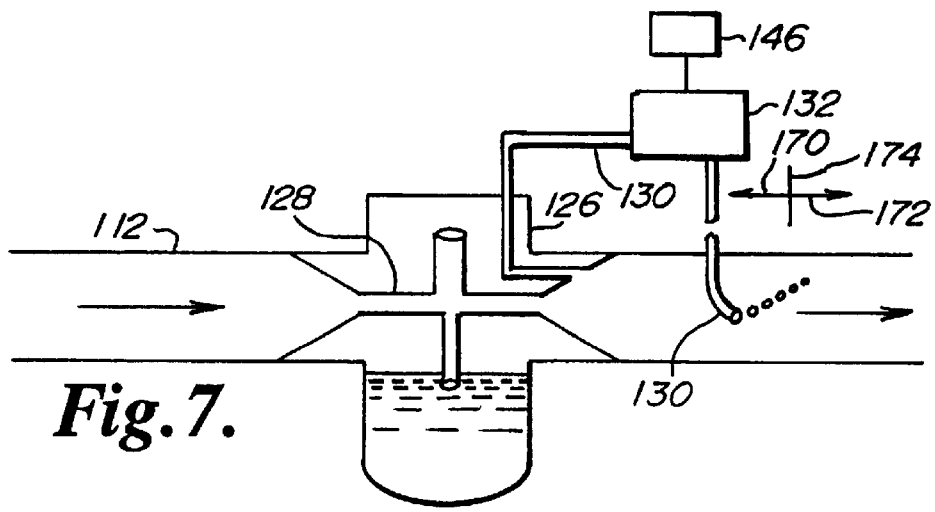
FIG. 7 is a partial vertical section of a first embodiment of an aerator of the present invention operably disposed in an outlet.

Referring to FIGS. 6, 7, and 8, the present system may be viewed as comprising an anaerobic portion 170 and an aerobic portion 172, the anaerobic portion 170 and aerobic portion 172 being separated by a boundary or interface 174. The interface 174 is formed by any of the present aerators. A characteristic of the present invention is that the BOD of the anaerobic portion 170 is substantially equal to the BOD of the aerobic portion 172. In other embodiments, the aerobic BOD is at least 90 percent, 95 percent, or 99 percent of the anaerobic BOD. Aeration is expressly considered to include oxygenating effluent by injecting the effluent with air with gas components present in the atmosphere and is not considered to include practices such as introducing hydrogen peroxide or ozone into the effluent.

This method has the advantage of significantly raising the dissolved oxygen content in the wastewater, without the laborious, expensive and frequently unpleasant tasks associated with lowering BOD and suspended solids of wastewater. The dissolved oxygen in the wastewater conveyed to disposal fields can enable aerobic decomposition of materials responsible for hydraulic clogging to restore or maintain hydraulic conductivity.

In a first aspect of this invention, the dissolved oxygen content of effluent aerated by the present system may be considered to be a measurable level of dissolved oxygen. A measurable level of dissolved oxygen would have a redox potential of at least about +400 mV at the biomat.

In a second aspect of this invention, the amount of oxygen dissolved in effluent by the present invention may be at least equal to the biomat BOD when measured over periods of 7 days, 14 days, 30 days, or six months. These periods are determined by factors such as the desired time in which the infiltrative capacity of the absorption field is to be restored to at least 50 percent of its former infiltrative capacity.

In a third aspect of this invention, the amount of dissolved oxygen in effluent may also be viewed in terms of the redox potential at the infiltrative surface of the absorption field, the infiltrative surface often coinciding with the biomat. Redox potentials of −250 mV, −75 mV, +120 mV, +220 mV, and +400 mV may be acceptable results of the present system. The exact redox potential necessary will be determined by factors such as the amount of time allowed for an aeration treatment, the reduction in infiltrative capacity of the absorption field, and whether aeration is to reclaim or to maintain the absorptive capacity of a given absorption field.

In some embodiments aeration may generate a supersaturated zone of effluent proximate the infiltrative surface. A supersaturated zone is considered to be a zone in which the concentration of oxygen exceeds that of atmospheric.

Stated otherwise, the amount of oxygen conveyed to the absorption field infiltrative surface may be that sufficient to increase the hydraulic conductivity of the absorption field proximate the infiltrative surface by at least 0.1 inch per hour over a 30 day period.

Because numerous embodiments and modifications of this invention may be made without departing from the spirit thereof, the scope of this invention is not to be limited to the embodiments illustrated and described. Rather the scope of this invention is to be determined by appended claims and their equivalents.

What is claimed is:

1. A wastewater disposal system, comprising:
    a hydraulic system with an anaerobic portion and an aerobic portion, the anaerobic portion with an anaerobic BOD, the aerobic portion downstream from the anaerobic portion and with an aerobic BOD, the anaerobic BOD substantially equal to the aerobic BOD; and
    an absorption field receiving effluent from the hydraulic system.

2. The wastewater disposal system of claim 1, the hydraulic system comprising:
    a settling tank;
    an impermeable fluid conducting member receiving effluent from the settling tank; and
    a permeable fluid conducting member receiving effluent from the impermeable fluid conducting member and providing openings for egressing effluent into the absorption field.

3. The wastewater disposal system of claim 2, the anaerobic portion disposed in a portion of the settling tank.

4. The wastewater disposal system of claim 2, the anaerobic portion disposed in the settling tank and a portion of the impermeable fluid conducting member.

5. The wastewater disposal system of claim 2, the anaerobic portion disposed in the settling tank and an adjoining portion of the impermeable fluid conducting member.

6. The wastewater disposal system of claim 2, in which the aerobic portion is intermittent.

7. The wastewater disposal system of claim 2, the hydraulic system further comprising an oxygenating mechanism configured and disposed to oxygenate effluent flowing through one of the settling tank and impermeable member, the oxygenating mechanism substantially separating the anaerobic portion from the aerobic portion.

8. The wastewater disposal system of claim 7, the oxygenating mechanism comprising an air pump.

9. The wastewater disposal system of claim 8, the air pump in fluid communication with the settling tank.

10. The wastewater disposal system of claim 8, the air pump in fluid communication with the impermeable conducting member.

11. The wastewater disposal system of claim 8, the oxygenating mechanism further comprising an oxygen sensor configured to sense a dissolved oxygen concentration in the effluent and to activate the air pump when the effluent dissolved oxygen concentration reaches a predetermined minimum effluent dissolved oxygen concentration.

12. The wastewater disposal system of claim 8, the oxygenating mechanism further comprising a timer in electric communication with the air pump and actuating the air pump to periodically oxygenate effluent.

13. The wastewater disposal system of claim 7, in which the oxygenating mechanism oxygenates the effluent to achieve an effluent oxygen concentration sufficient to support aerobic soil organisms in the absorption field.

14. The wastewater disposal system of claim 2, in which the absorption field defines a plurality of infiltrative surfaces, the plurality of infiltrative surfaces in turn defining a trench accommodating the permeable fluid conducting member.

15. The wastewater disposal system of claim 14, further comprising aggregate disposed in the trench and substantially surrounding the permeable fluid conducting member.

16. The wastewater disposal system of claim 15, further comprising a lift station in fluid communication with the impermeable fluid conducting member.

17. The wastewater disposal system of claim 1, in which the aerobic BOD is at least 90 percent of the anaerobic BOD.

18. The wastewater disposal system of claim 1, in which the aerobic BOD is at least 95 percent of the anaerobic BOD.

19. The wastewater disposal system of claim 1, in which the aerobic BOD is at least 99 percent of the anaerobic BOD.

20. A process for enhancing effluent infiltration capacity of an absorption field, the absorption field defining an infiltrative surface and receiving effluent from a hydraulic system at the infiltrative surface, the hydraulic system comprising an anaerobic portion and an aerobic portion separated at an interface, the anaerobic portion characterized by an anaerobic BOD, the aerobic portion downstream from the anaerobic portion and characterized by an aerobic BOD, the anaerobic BOD substantially equal to the aerobic BOD, the process comprising:

dissolving atmospheric $O_2$ in the effluent proximate the interface between the anaerobic portion and the aerobic portion, thereby generating oxygenated effluent; and flowing the oxygenated effluent from the interface to the absorption field infiltrative surface.

21. The process of claim 20, the absorption field comprising a biomat proximate the infiltrative surface, the process further comprising aerobically decomposing the biomat.

22. The process of claim 20, the hydraulic system comprising a settling tank and in which $O_2$ is dissolved in the effluent when the effluent is flowing through the settling tank.

23. The process of claim 22, the hydraulic system comprising an aerator disposed in the settling tank, the aerator dissolving $O_2$ in the effluent when the effluent is flowing through the settling tank.

24. The process of claim 20, the hydraulic system comprising an aerator, a settling tank, and an impermeable fluid conducting member receiving effluent from the settling tank, the aerator dissolving $O_2$ in the effluent when the effluent is flowing through the impermeable fluid conducting member.

25. The process of claim 20, the hydraulic system comprising an aerator and a timer actuating the aerator for a predetermined period of time and in which $O_2$ is dissolved in the effluent flowing through the hydraulic system when the timer actuates the aerator for a predetermined period of time.

26. The process of claim 20, the hydraulic system comprising an aerator and an oxygen sensor configured to determine an $O_2$ concentration in the effluent downstream from the aerator and to actuate the aerator when said downstream effluent $O_2$ concentration is less than a predetermined value and in which the oxygen sensor activates the aerator when said downstream effluent $O_2$ concentration is less than said predetermined value.

27. The process of claim 20, the hydraulic system comprising a settling tank and an impermeable member receiving effluent from the settling tank, $O_2$ being dissolved in the effluent when the effluent is flowing through the impermeable member.

28. The process of claim 20, the hydraulic system comprising a settling tank, an impermeable member receiving effluent from the settling tank, and a permeable member receiving effluent from the impermeable member, $O_2$ being dissolved in the effluent when the effluent is flowing through the permeable member.

29. The process of claim 20, the hydraulic system comprising an aerator, $O_2$ being dissolved in the effluent by the aerator at a location proximate the interface.

30. The process of claim 20, the hydraulic system comprising a settling tank, an impermeable member receiving effluent from the settling tank, a lift station in fluid communication with the impermeable member, and an aerator dissolving $O_2$ in the effluent proximate the lift station.

31. The process of claim 20, the absorption field comprising a biomat proximate the infiltrative surface, the biomat with a BOD and in which the amount of $O_2$ dissolved in the effluent is at least equal to the biomat BOD over a 7 day period.

32. The process of claim 20, the absorption field comprising a biomat proximate the infiltrative surface, the biomat with a BOD and in which the amount Of $O_2$ dissolved in the effluent is at least equal to the biomat BOD over a 14 day period.

33. The process of claim 20, the absorption field comprising a biomat proximate the infiltrative surface, the biomat with a BOD and in which the amount of $O_2$ dissolved in the effluent is at least equal to the biomat BOD over a 30 day period.

34. The process of claim 20, the absorption field comprising a biomat proximate the infiltrative surface, the biomat with a BOD and in which the amount of $O_2$ dissolved in the effluent is at least equal to the biomat BOD over a 60 day period.

35. The process of claim 20, the absorption field comprising a biomat proximate the infiltrative surface, the biomat with a BOD mass load and in which the amount of $O_2$ dissolved in the effluent over a period of at least 30 days is at least equal to the BOD mass load, said BOD mass load being equal to a BOD of effluent entering the infiltrative surface multiplied by a flow rate of wastewater contacting the infiltrative surface.

36. The process of claim 20, in which the $O_2$ dissolved in the effluent is sufficient to create an $O_2$ concentration in the effluent such that an oxidation/reduction potential of at least −250 mV is generated proximate the infiltrative surface.

37. The process of claim 20, in which the $O_2$ dissolved in the effluent is sufficient to create an $O_2$ concentration in the effluent such that an oxidation/reduction potential of at least −75 mV is generated proximate the infiltrative surface.

38. The process of claim 20, in which the $O_2$ dissolved in the effluent is sufficient to create an $O_2$ concentration in the effluent such that an oxidation/reduction potential of at least +120 mV is generated proximate the infiltrative surface.

39. The process of claim 20, in which the $O_2$ dissolved in the effluent is sufficient to create an $O_2$ concentration in the effluent such that an oxidation/reduction potential of at least +220 mV is generated proximate the infiltrative surface.

40. The process of claim 20, in which the $O_2$ dissolved in the effluent is sufficient to create an $O_2$ concentration in the effluent such that an oxidation/reduction potential of at least +400 mV is generated proximate the infiltrative surface.

41. The process of claim 20, in which the $O_2$ dissolved in the effluent is sufficient to create a measurable $O_2$ concentration in the effluent at the infiltrative surface.

42. The process of claim 20, in which the $O_2$ dissolved in the effluent over a 30 day period is sufficient to increase the hydraulic conductivity of the soil proximate the interface by at least 0.1 inch per hour.

43. The process of claim 20, in which the $O_2$ dissolved in the effluent over a 30 day period is sufficient to eliminate ponding at the interface.

44. The process of claim 20, in which the $O_2$ dissolved in the effluent over a 60 day period is sufficient to eliminate ponding at the interface.

45. The process of claim 20, in which the $O_2$ dissolved in the effluent over a 90 day period is sufficient to eliminate ponding at the interface.

46. The process of claim 20, in which the $O_2$ dissolved in the effluent over a 180 day period is sufficient to eliminate ponding at the interface.

47. The process of claim 20, in which the $O_2$ dissolved in the effluent while flow is occurring to the infiltrative surface is sufficient to create an $O_2$ concentration in the effluent such that a supersaturated zone is generated proximate the infiltrative surface.

48. A process for raising an effluent infiltration capacity of an absorption field, the absorption field receiving effluent from a hydraulic system at an absorption field infiltrative surface, the hydraulic system comprising a settling tank, at least one impermeable line, at least one permeable lateral, and an aerator, effluent flowing from the settling tank through each said impermeable line and through each said permeable lateral to the infiltrative surface, the aerator in fluid contact with the hydraulic system at an aerating site, effluent in an upstream portion of the hydraulic system from the aerating site characterized by an upstream BOD, effluent in a downstream portion of the hydraulic system from the aerating site characterized by a downstream BOD, the upstream BOD substantially equal to the downstream BOD, the process comprising activating the aerator, thereby generating aerated effluent at the aerating site.

49. The process of claim 48, the hydraulic system further comprising a timer actuating the aerator for a predetermined period of time and in which said aerated effluent is generated for the predetermined period of time.

50. The process of claim 48, the upstream portion of the hydraulic system further comprising an oxygen sensor sensing an $O_2$ concentration of said effluent and actuating the aerator when said effluent $O_2$ concentration is less than a predetermined minimum effluent $O_2$ concentration, in which the aerator is activated by the oxygen sensor in response to said effluent $O_2$ concentration being less that said predetermined minimum effluent $O_2$ concentration.

51. The process of claim 48, the absorption field comprising a biomat coincident the infiltrative surface and in which said aerated effluent aerobically decomposes at least a portion of the biomat.

52. The process of claim 48, the absorption field including a biomat coincident the infiltrative surface, the biomat characterized by a biomat BOD, the aerated effluent characterized by a dissolved $O_2$ concentration, and in which the aerated effluent dissolved $O_2$ concentration is at least equal to the biomat BOD over a 14 day period.

53. The process of claim 48, the absorption field including a biomat proximate the infiltrative surface, the biomat characterized by a biomat BOD, the aerated effluent characterized by a dissolved $O_2$ concentration, and in which the aerated effluent dissolved $O_2$ concentration is at least equal to the biomat BOD over a 30 day period.

54. The process of claim 48, the absorption field including a biomat proximate the infiltrative surface, the biomat characterized by a biomat BOD, the aerated effluent characterized by a dissolved $O_2$ concentration, and in which the aerated effluent dissolved $O_2$ concentration is at least equal to the biomat BOD over a 90 day period.

55. The process of claim 48, the absorption field including a biomat proximate the infiltrative surface, the biomat characterized by a biomat BOD, the aerated effluent characterized by a dissolved $O_2$ concentration, and in which the aerated effluent dissolved $O_2$ concentration is at least equal to a BOD mass load over a 180 day period.

56. A wastewater disposal system, comprising:
 a hydraulic system with an anaerobic portion and an oxidizing portion, the anaerobic portion characterized by an anaerobic portion BOD, the oxidizing portion downstream from the anaerobic portion and characterized by an oxidizing portion BOD, the anaerobic BOD substantially equal to the oxidizing portion BOD; and
 an absorption field receiving effluent from the hydraulic system.

57. The wastewater disposal system of claim 56, in which the oxidizing portion BOD is at least 90 percent of the anaerobic BOD.

58. The wastewater disposal system of claim 56, in which the oxidizing portion BOD is at least 95 percent of the anaerobic BOD.

59. The wastewater disposal system of claim 56, in which the oxidizing portion BOD is at least 99 percent of the anaerobic BOD.

60. The wastewater disposal system of claim 56, the hydraulic system comprising a settling tank, an impermeable fluid conducting member, and a permeable fluid conducting member, the settling tank receiving wastewater from a wastewater source, the impermeable fluid conducting member receiving effluent from the settling tank, and the permeable fluid conducting member receiving effluent from the impermeable fluid conducting member and having openings for egressing effluent into the absorption field.

61. The wastewater disposal system of claim 60, the anaerobic portion disposed in a portion of the settling tank.

62. The wastewater disposal system of claim 60, the anaerobic portion disposed in the settling tank and a portion of the impermeable fluid conducting member.

63. The wastewater disposal system of claim 60, the anaerobic portion disposed in the settling tank and an adjoining portion of the impermeable fluid conducting member.

64. The wastewater disposal system of claim 60, in which the anaerobic portion is intermittent.

65. The wastewater disposal system of claim 60, the hydraulic system further comprising an aerator configured and disposed to oxygenate effluent flowing through one of the settling tank and impermeable fluid conducting member, thereby separating the anaerobic portion from the oxidizing portion.

66. The wastewater disposal system of claim 65, further comprising an oxygen sensor configured to sense a dissolved oxygen concentration in the effluent and to activate the aerator when the dissolved oxygen concentration is less than a predetermined minimum effluent dissolved oxygen concentration.

67. The wastewater disposal system of claim 65, further comprising a timer in electric communication with the aerator and configured to activate the aerator to periodically aerate effluent.

* * * * *